(12) United States Patent
Westenberg

(10) Patent No.: US 7,689,859 B2
(45) Date of Patent: Mar. 30, 2010

(54) BACKUP SYSTEM AND METHOD

(75) Inventor: Guido Westenberg, Columbia Heights, MN (US)

(73) Assignee: Symantec Operating Corporation, Mountain View, CA (US)

( * ) Notice: Subject to any disclaimer, the term of this patent is extended or adjusted under 35 U.S.C. 154(b) by 533 days.

(21) Appl. No.: 11/643,503

(22) Filed: Dec. 20, 2006

(65) Prior Publication Data

US 2010/0005258 A1    Jan. 7, 2010

(51) Int. Cl.
*G06F 11/00*    (2006.01)
(52) U.S. Cl. ......................................................... 714/6
(58) Field of Classification Search ........................ None
See application file for complete search history.

(56) References Cited

U.S. PATENT DOCUMENTS

| | | |
|---|---|---|
| 6,795,966 B1 | 9/2004 | Lim et al. |
| 7,093,086 B1 | 8/2006 | Van Rietschote |
| 7,213,246 B1 | 5/2007 | van Rietschote |
| 7,246,200 B1 | 7/2007 | van Rietschote |
| 7,533,229 B1 | 5/2009 | van Rietschote |
| 2006/0085792 A1 | 4/2006 | Traut |
| 2006/0225065 A1 | 10/2006 | Chandhok et al. |
| 2007/0260831 A1* | 11/2007 | Michael et al. ............. 711/162 |
| 2007/0271428 A1* | 11/2007 | Atluri ........................ 711/162 |

FOREIGN PATENT DOCUMENTS

| | | |
|---|---|---|
| GB | 2378535 | 12/2003 |
| WO | 2007/130192 | 11/2007 |

OTHER PUBLICATIONS

VMWARE, Inc.; "Virtual Machine Backup Guide" [online] published Sep. 2006. http://www.vmware.com/pdf/vi3_301_201_vm_backup.pdf [accessed Apr. 16, 2008].
Combined Search and Examination Report; Application No. GB0724877.6; Date of Report: Apr. 21, 2008.
Search Report under Section 17; Application No. GB0724877.6; Date of Report: Apr. 21, 2008.
Harriman-Polanski, K.; "CommVault Galaxy Enhances Data Protection for VMware ESX Server Virtual Machines" [online]; published May 2006; Dell Power Solutions; http://www.dell.com/downloads/global/power/ps2q06-20060306-CommVault.pdf [accessed Apr. 16, 2008].
U.S. Appl. No. 10/109,406, filed Mar. 28, 2002, entitled Virtual Machine Transfer Between Computer Systems.

* cited by examiner

*Primary Examiner*—Michael C Maskulinski
(74) *Attorney, Agent, or Firm*—Meyertons, Hood, Kivlin, Kowert, Goetzel, P.C.

(57) ABSTRACT

Backup of a production instance of an application in a production machine environment is performed by creating a snapshot image that captures the state of the production machine, and then backing up the application from a backup machine created using the snapshot image. The backup of the application can be effected by shutting down the backup machine and backing up its storage, or by using backup software to act on the backup version of the application.

24 Claims, 7 Drawing Sheets

BACKUP SYSTEM AND METHOD

BACKGROUND

1. Field of the Invention

This invention relates to providing a backup of a computer system application in a real time environment.

2. Related Art

Backup and archival of data from applications is a particular problem where the applications are required to run continuously without interruption (24×7 applications). In such an environment, the lack of ability to quiesce and pause operations for backup is a difficult technical problem that still does not have a good, universal solution. Also, typical application vendor approved backup methods are associated with a performance impact on applications.

Indeed, currently available backup methods all have drawbacks including one or more of: requiring application vendor support, requiring application specific code in the backup product, performance impact (sometimes to the extent of temporary application shutdown) on the production or live instance of the application, or lack of guaranteed consistency and recoverability of the captured data.

Examples of prior techniques for providing backup of a production instance of the application can be found in the following articles:

http://www.falconstor.com/en/solutions/index.cfm?pg=Application&sb=VMw are&bhcp=1 http://www.dell.com/downloads/global/power/ps2q06-20060306-CommVault.pdf http://www.redbooks.ibm.com/Redbooks.nsf/Redbook-Abstracts/tips0398.html?Open The techniques described in the above referenced articles include the backup of a production instance of an application, and in some cases, describe a requirement to quiesce that production instance to guarantee capturing a consistent application state.

There is a therefore need to provide for the universal backup of, for example, 24×7 applications in a consistent way.

SUMMARY

An example embodiment provides for the backup of a production instance of an application in a production machine environment by creating a snapshot image that captures the state of the production machine, and then backing up the application from a backup version of the machine created using the snapshot image.

An example embodiment provides a computer system comprising at least one processor and storage. The computer system is operable to provide a first machine instance in which an application is run, to take a snapshot image of the first machine instance, to initiate a second machine instance from the snapshot and to backup the application from the second machine instance.

An example embodiment of the invention provides a universal solution to the technical problem of providing backup and archival of data from applications that run 24×7 and are unable to quiesce and pause operations without impacting production performance. An example embodiment of the invention can avoid, or at least mitigate, the drawbacks of prior approaches that include a requirement for application vendor support, a requirement for application specific code in the backup product, performance impact (sometimes to the extent of temporary application shutdown) on a production instance of the application, and a lack of guaranteed consistency and recoverability of the captured data.

In an example embodiment the production machine is a virtual machine, whereby the backup version of the machine is a backup virtual machine. In one embodiment a backup of the application can then be effected by performing an orderly shutdown of the backup virtual machine. This example does not require a quiesce of the application and backs up a second instance of the application, thus reducing impact on the production instance. In another embodiment a backup of the application can then be effected using backup software to act on the backup instance of the application. Application vendor approved backup methods can be applied without the impact on applications usually associated with those methods.

An embodiment of the invention differs from prior techniques described above in that it does not require a quiesce of the production instance and backs up a second instance, thus reducing impact.

Although various aspects of the invention are set out in the accompanying independent claims, other aspects of the invention include any combination of features from the described embodiments and/or the accompanying dependent claims with the features of the independent claims, and not solely the combinations explicitly set out in the accompanying claims.

BRIEF DESCRIPTION OF THE FIGURES

Specific embodiments of the present invention will now be described by way of example only with reference to the accompanying Figures in which.

Figure 1:
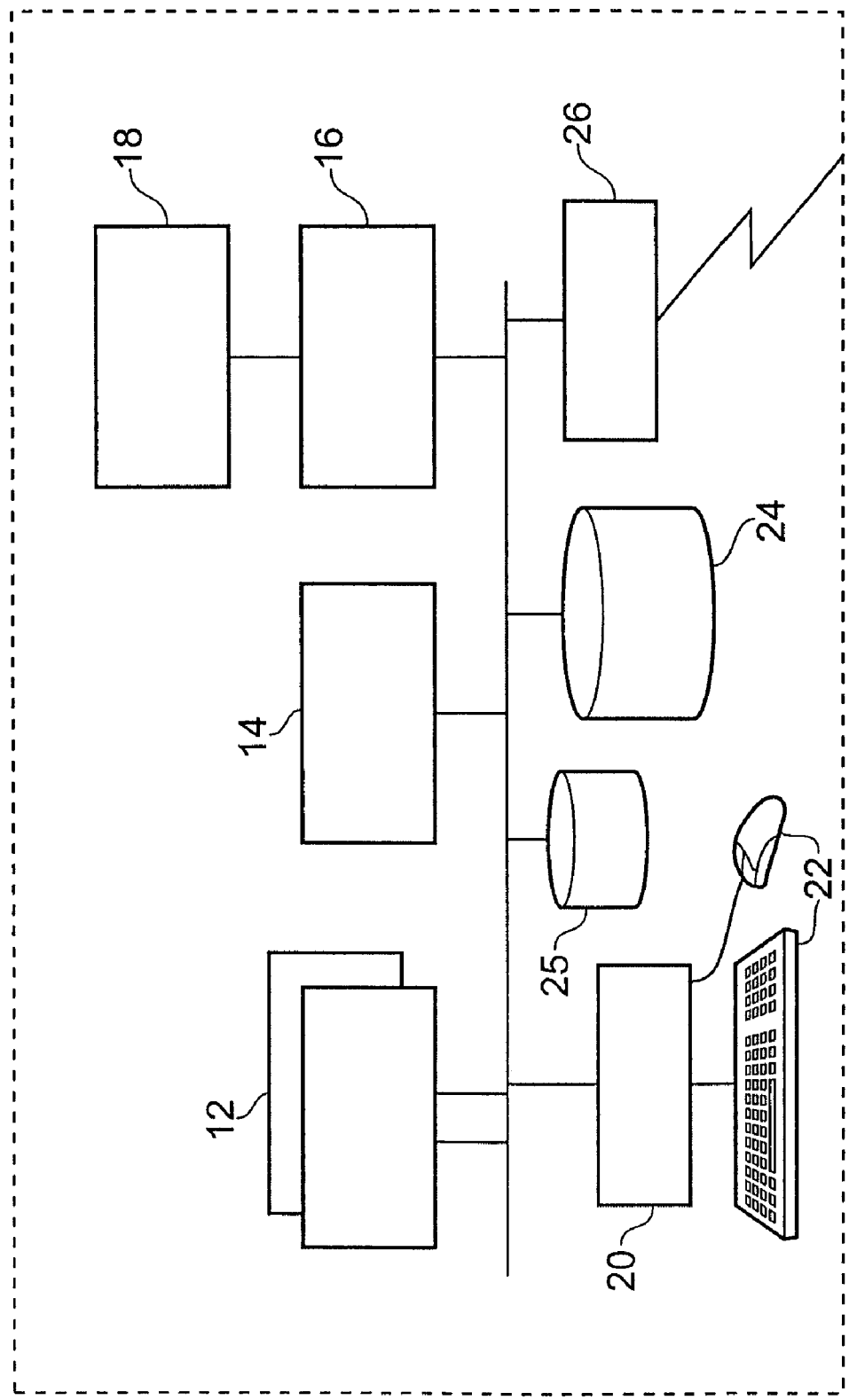
FIG. 1 is a schematic representation of elements of a computer system 10 for implementing an embodiment of the invention.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Backup of an application running in a live (i.e., active or production) physical or virtual machine environment (i.e., a first "instance" of the machine) can be achieved by creating a snapshot image that captures the state of the machine at a given point in time, initiating a second instance of the machine by using the snapshot image, and backing up the application from within the second instance of the machine.

Because the second instance of the machine provides an operating environment that is distinct from the first instance of the machine, backing up the application from within the second instance of the machine does not impact the live operation of the application in the first instance of the machine.

In an example embodiment, the live machine environment is a live virtual machine environment. By taking a snapshot of the live virtual machine environment, a backup instance of the virtual machine can be created. Shutdown of the application in the backup instance of the virtual machine (or shutdown of the entire backup instance of the virtual machine) enables orderly shutdown of the application without impacting the live virtual machine environment. This allows the capture of a guaranteed consistent state of any application's data without requiring the application to support quiescence or hot backup. In another example embodiment, a backup instance of a production application can be effected using virtual machine technology, providing backup software with full access to supported application interfaces while reducing impact on the production instance of the application.

A first example embodiment of the invention can use existing virtual machine technology to create a second, instance of a running application. Without impacting the production instance, this second instance can be shutdown in an orderly manner, thus guaranteeing that the application saves its entire state to storage. That storage can then be backed up and thereby can capture a state of the application data that is consistent and recoverable.

Figure 9:
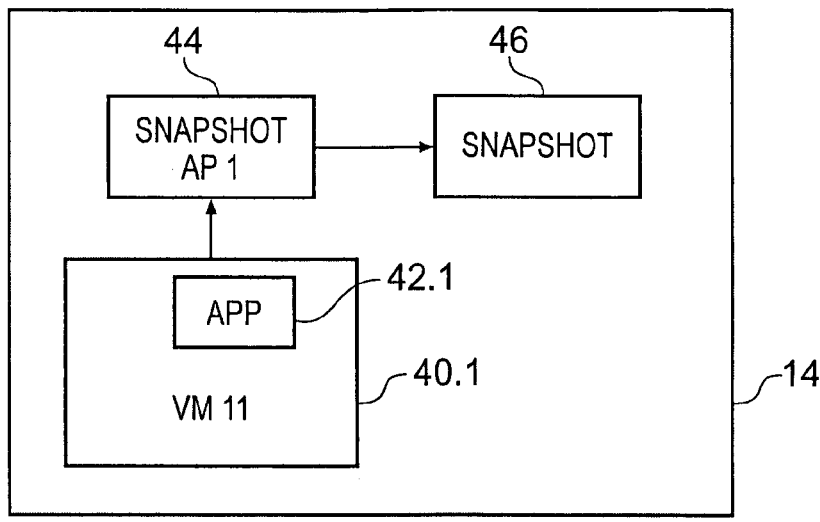
FIG. 9 illustrates a stage in example of FIG. 8.

FIG. 1 is a schematic representation of elements of a computer system 10 for implementing an embodiment of the invention. The computer system as shown in FIG. 1 includes one or more processors 12, memory 14 (e.g., read only and/or random access memory), a display adapter 16 connected to a display 18, an interface adapter 20 connected to one or more user input devices 22 such as keyboard and a mouse, storage 24 (e.g., a disk or solid state non-volatile storage) and a communications adapter 26 for connection to an external network. As illustrated in FIG. 1, the various components are connected via a bus structure 28. In the example shown in FIG. 1, the storage 24 could be used for the storage of programs and data, and could also be used as backup storage. Alternatively or in addition, separate further storage 25 could be used as backup storage. It will be appreciated that FIG. 9 is merely schematic and illustrative of components of a computer system, and that a computer system for implementing the invention can have other forms and/or a computer system for implementing the invention can comprise a plurality of computers.

Figure 2:
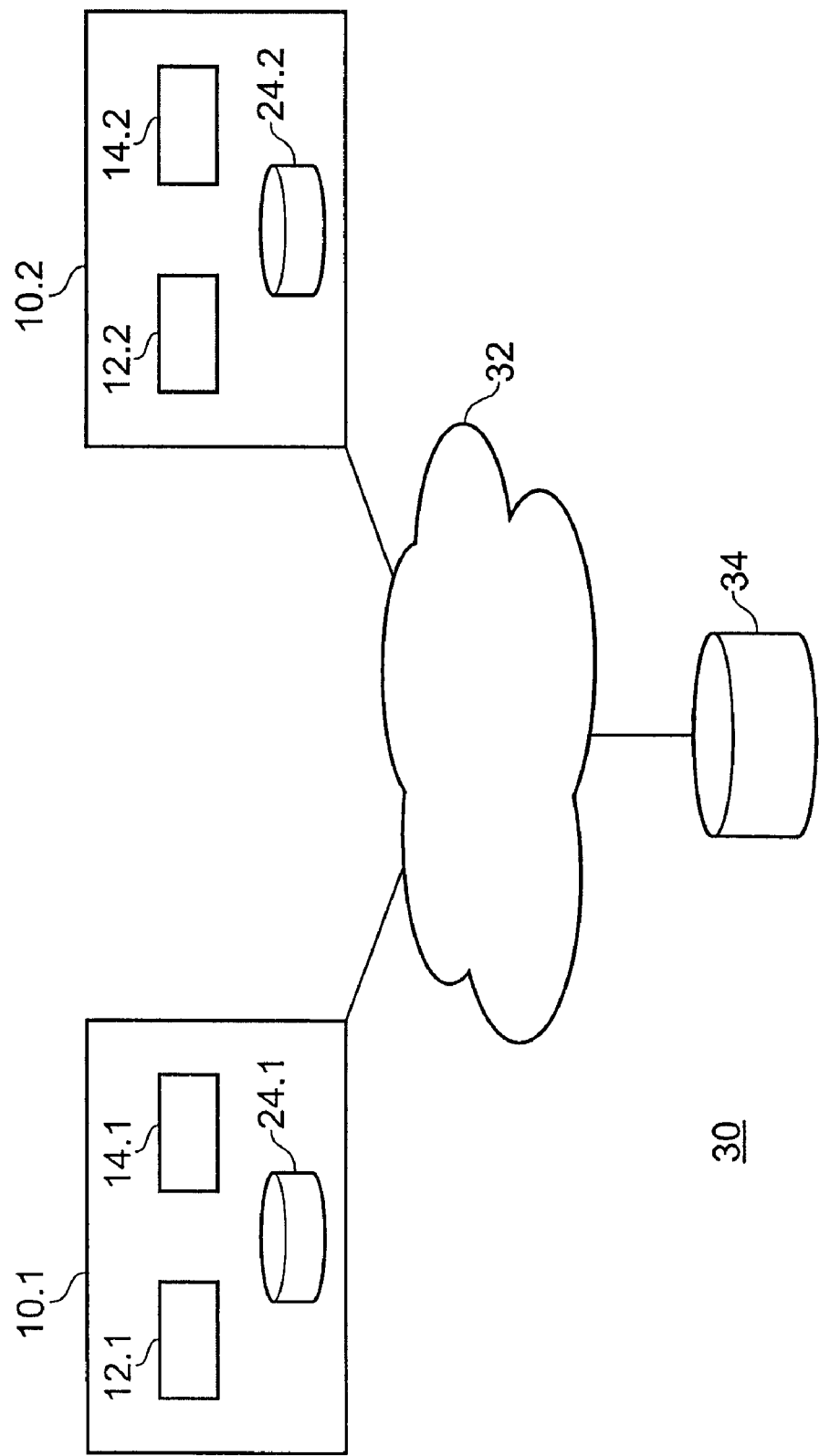
FIG. 2 is a schematic representation of a networked system.

For example, FIG. 2 represents a networked system 30 of at least first and computers 10.1 and 10.2 connected via a network 32. Each of the computers 10.1, 10.2 includes one or more processors 12.1, 12.2, memory 14.1, 14.2 and storage 24.1, 24.2, respectively, plus other components, for example including such components as illustrated in FIG. 1. In the networked system 30 illustrated in FIG. 2, the first computer 10.1 could be configured as a production system, and the second computer system could be configured as a backup system, with the storage being used for backing up the production system. Alternatively, or in addition, both of the first and second computer systems 10.1 and 10.2, and possibly further computer systems (not shown), could be configured as production systems. Separate storage 34, possibly forming part of a further computer system, could be used for backup storage.

Figure 3:
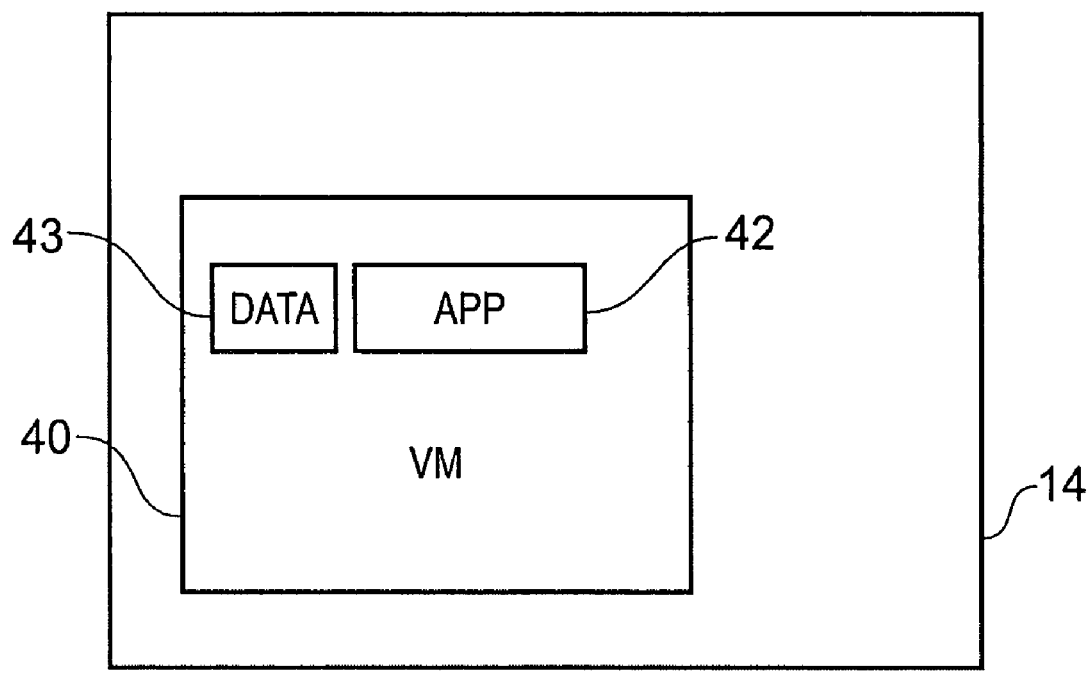
FIG. 3 is a schematic representation of contents of a memory of the computer system of FIG. 1.

FIG. 3 is a schematic representation of components to be found in the memory 14 of a live production system. In this example, software and data held in the memory 14 and the associated storage 24 (see FIG. 1) cause the processor(s) 12 (see FIG. 1) to implement a virtual machine environment (a virtual machine) 40 in which one or more production applications to be protected 42 can be run. The production application 42 can, for example, be an application (one or more computer programs) that is to be operative substantially continuously (24/7) with a very low outage rate. Associated with the production application is data 43. Although only the memory 14 is represented in FIG. 3, it is to be appreciated that at least part of the production application 42 and the associated data 43 can be held in the storage 24, even when the production application 42 is live, or active, in a live, or active, virtual machine environment.

Figure 4:
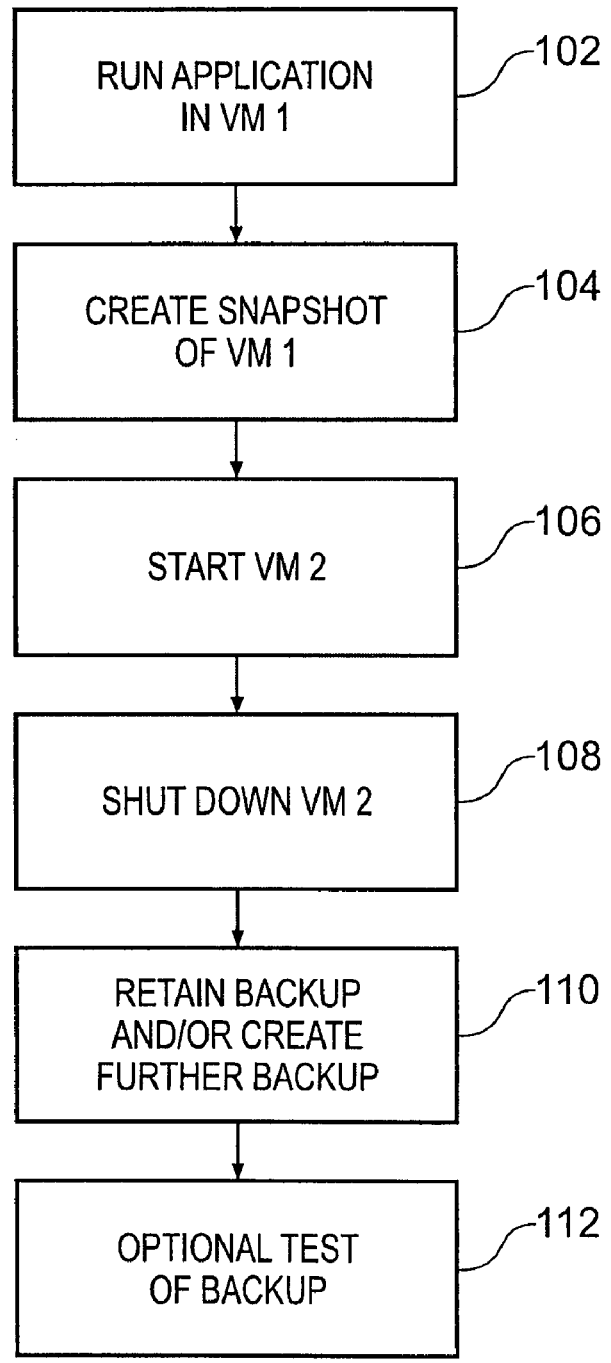
FIG. 4 is a flow diagram of the operation of a first example embodiment of the invention.

The operation of a first example embodiment 100 is described with reference to FIG. 4.

In this embodiment, a production application 42 to be protected is run in a virtual machine environment 40 as represented in FIG. 3. The virtual machine environment 40 is configured to allow the creation of a snapshot of the virtual machine (the in-memory state) and its associated storage. The only impact on the live, or active, production instance of the application is the impact of creating the virtual machine snapshot, as dictated by the particular virtual machine technology used for the application.

Figure 5:
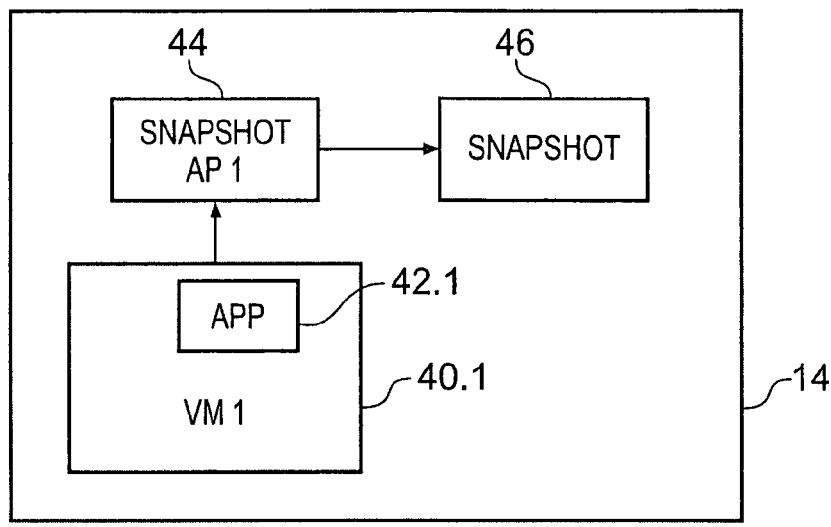
FIG. 5 illustrates a stage in example of FIG. 5.

Accordingly, in step 102 the application 42 to be protected (a production instance 42.1 of the application—see FIG. 5) is run in a live, or active, virtual machine environment 40.1 (see FIG. 5).

In step 104, a utility (e.g. a snapshot application programming interface (API) 44—see FIG. 5) is operable to create a snapshot 46 (see FIG. 5) of the live virtual machine environment 40.1 in which the production instance 42.1 of the application is running. A description of an example of a snapshot utility is to be found, for example, at http://www.vmware.com/support/ws55/doc/ws_preserve.html.

Figure 6:
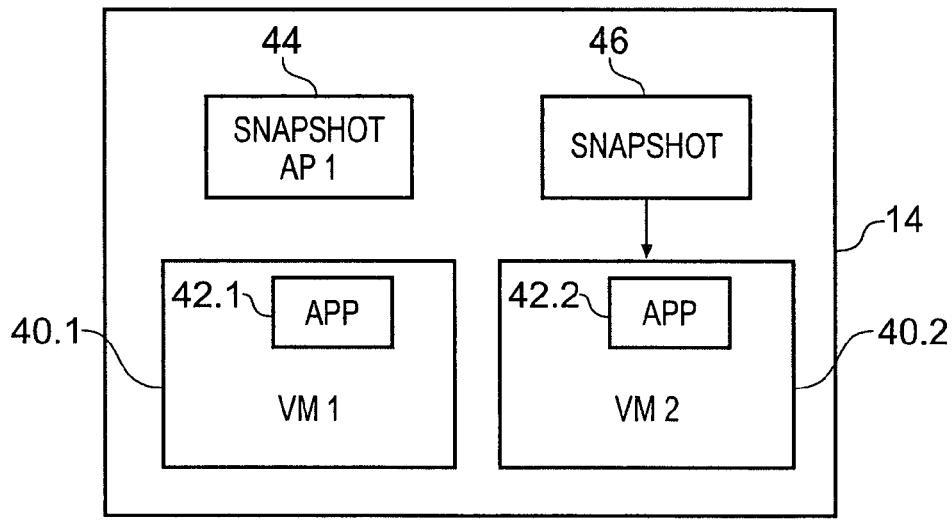
FIG. 6 illustrates another stage in example of FIG. 5.

In step 106, after creating such a snapshot 46 of the virtual machine environment 40.1 in which the production instance 42.1 of the application is being run, the utility 44 can be operable to use the snapshot 46 to start a second virtual machine environment 40.2 running a backup instance 42.2 of the same application, as represented in FIG. 6. This second virtual machine environment 42.2 forms a backup instance virtual machine that can be configured such that it does not share network connections with the production environment. For example, the second virtual machine environment does not need to have network connections. The second virtual machine start-up can also be configured such that the memory and storage associated therewith is distinct from that of the first virtual machine (e.g., in a different address range) to form a separate and writable snapshot of the production storage. Providing the separate and writable snapshot can enable an application to flush its state to disk as part of a shutdown process, without affecting the first instance. The "writable snapshot" can be formed in any appropriate manner, for example through the use of, a checkpointing process, a specific snapshot process, a Business Continuance Volumes (BCVS) process, a split-mirror process, or even storage on a separate set of disks with a copy of the data.

As the second, backup instance, machine does not share network connections with the first, production instance, machine and has memory and storage distinct from that of the first, production instance, machine, the second, backup instance machine can be said to be "isolated" from the first, production instance, machine.

Figure 7:
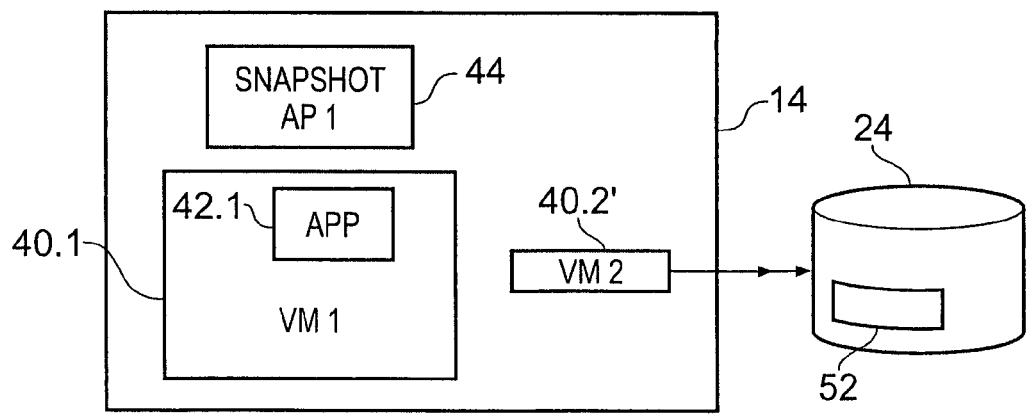
FIG. 7 illustrates a further stage in example of FIG. 5.

In step 108 the second virtual machine environment 40.2 in which the backup instance of the application is running (as represented at 40.2' in FIG. 7) shuts down in an orderly manner. Shutting down the backup instance in an orderly manner enables flushing of its state to storage (for example the storage 24 shown in FIG. 1) such that it can be restarted when the machine is rebooted.

In step 110, after the second virtual machine environment has been shut down, the stored state of the application on storage can be retained as a backup image 52 (FIG. 7) and/or further backup images (not shown in FIG. 7) can be created from the storage of the second virtual machine environment. Any such backup images are consistent and recoverable, as a business application can be expected to recover from an orderly shutdown.

In step 112, recoverability of the backup image can optionally be tested by restarting this virtual machine and testing the availability of the application after the restart.

During the process represented in FIGS. 3 to 7, the production instance of the application can continue to run unaffected (other than the initial impact of creating the virtual machine snapshot). The backup instance of the application can be created anywhere. For example, it can be created off-host from the production instance, possibly on a backup media server (e.g., the computer system 10.2 of FIG. 2) if it is desired to further improve the performance of the backup. In this example embodiment application vendor support is not required, and no application specific code is involved in the backup process.

It is known use of virtual machine (VM) technology to create alternate instances of applications for the purpose of fail-over or migration (see for example http://eval.veritas.com/downloads/news/Illuminata-Aug05.pdf and http://www.usenix.org/event/usenix05/tech/general/full_papers/short_papers/nelson/nelson_html/index.html).

Figure 8:
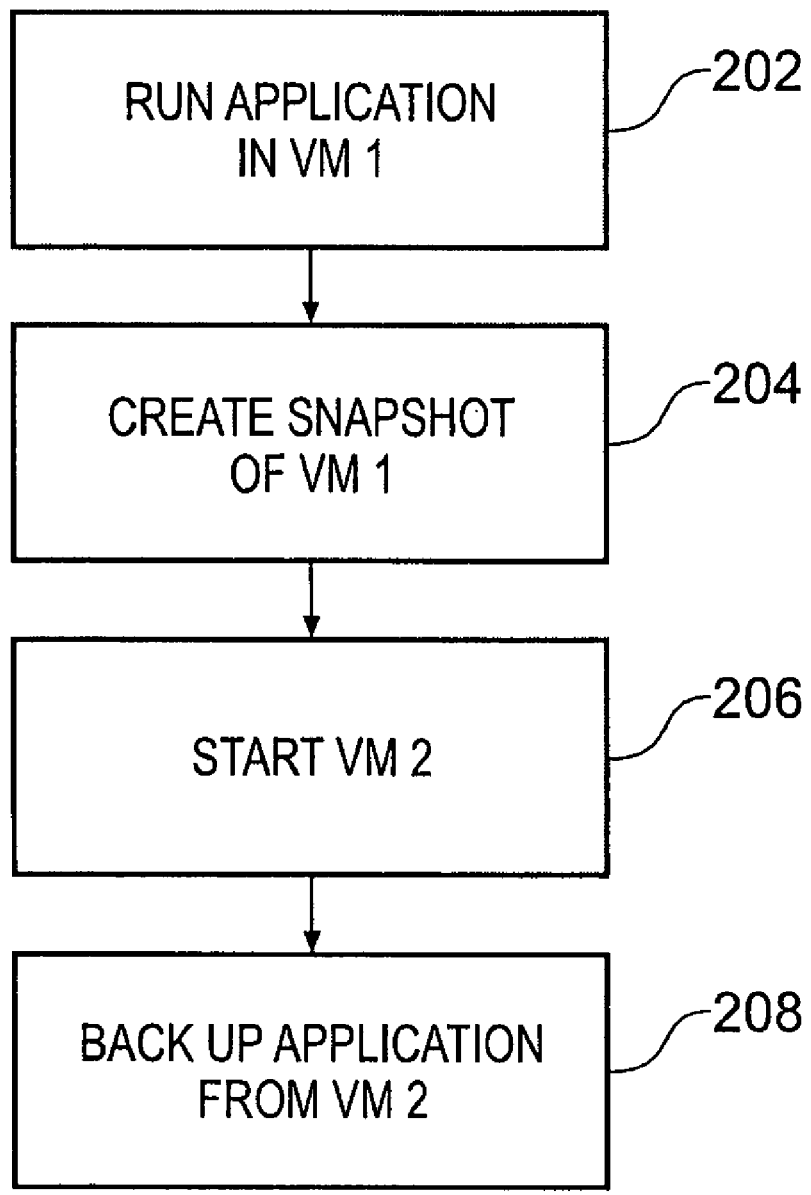
FIG. 8 is a flow diagram of the operation of a second example embodiment of the invention.

A further example embodiment 200 is described with reference to FIG. 8. This example also makes use of virtual machines to minimize production impact of application backup. This second example differs from the first example in that it does not use an application shutdown to capture a quiesced state of an application's data, but instead relies on application-supported interfaces for the backup.

Accordingly, in step 202 the application 42 to be protected (a production instance 42.1 of the application—see FIG. 5) is run in a live, or active, virtual machine environment 40.1 (see FIG. 9).

In step 204, a utility (e.g. a snapshot application programming interface (API) 44—see FIG. 9) is operable to create a snapshot 46 (see FIG. 9) of the live virtual machine environment 40.1 in which the production instance 42.1 of the application is running.

Figure 10:
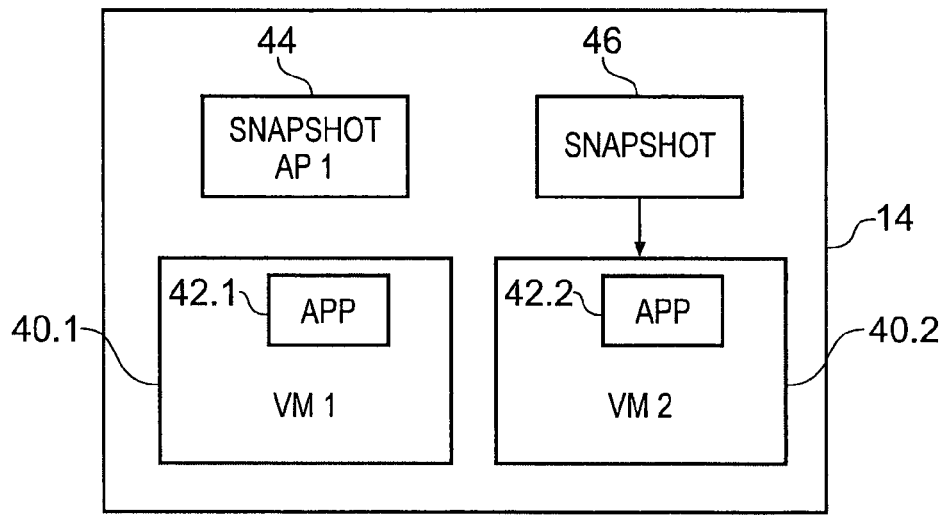
FIG. 10 illustrates another stage in example of FIG. 8.

In step 206, after creating such a snapshot 46 of the virtual machine environment 40.1 in which the production instance 42.1 of the application is being run, the utility 44 can be operable to use the snapshot 46 to start a second virtual machine environment 40.2 running a backup instance 42.2 of the same application, as represented in FIG. 10. This second virtual machine environment 42.2 forms a backup instance virtual machine that can be configured such that it does not share network connections with the production environment. For example, the second virtual machine environment does not need to have network connections. The second virtual machine start-up can also be configured such that the memory and storage associated therewith is distinct from that of the first virtual machine (e.g., in a different address range) to form a separate and writable snapshot of the production storage. Providing the separate and writable snapshot can enable an application to flush its state to disk as part of a shutdown process, without affecting the first instance. The "writable snapshot" can be formed in any appropriate manner, for example through the use of, a checkpointing process, a specific snapshot process, a Business Continuance Volumes (BCVS) process, a split-mirror process, or even storage on a separate set of disks with a copy of the data.

As the second, backup instance, machine does not share network connections with the first, production instance, machine and has memory and storage distinct from that of the first, production instance, machine, the second, backup instance machine can be said to be "isolated" from the first, production instance, machine.

This example embodiment can use snapshot technology to create the second, instance of a running application and then without impacting the production instance. This second instance can be accessed by conventional backup software allowing full access to application interfaces without impacting the production instance of the application.

Figure 11:
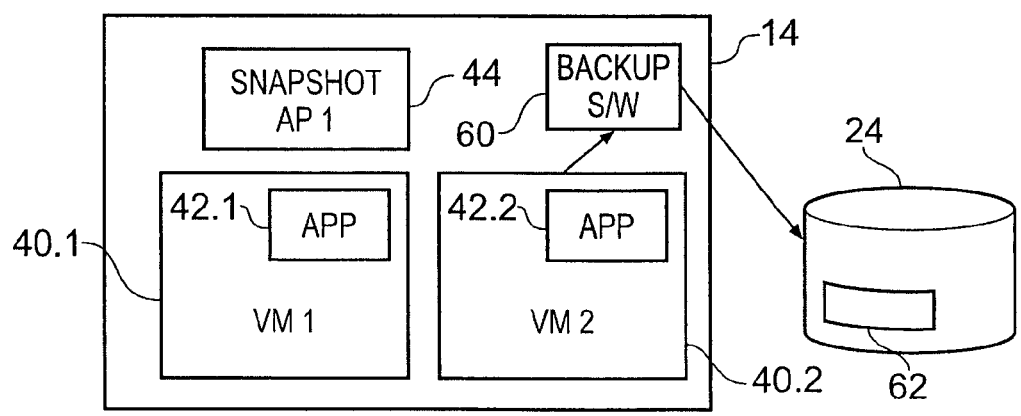
FIG. 11 illustrates a further stage in example of FIG. 8.

In step 208 of FIG. 9, and as also represented in FIG. 11, in this example embodiment backup software 60 is then instructed to use application agents (for example existing vendor supplied backup agents) to backup the backup instance 42.2 of the application from the backup virtual machine environment 40.2 instead of the production instance 42.1 from the production virtual machine environment. The backup software can apply all backup features using supported application interfaces without impacting on the production instance of the application. This enables the backup to be created using mechanisms supported by an application vendor.

The use of the snapshot in this example enables a backup instance of one or more production applications to created using existing virtual machine technology, thereby reducing impact on the production instance, while still providing the backup software with full access to supported application interfaces. This example embodiment allows application vendor approved backup methods to be applied without the application impact usually associated with those methods.

During the process represented in FIGS. 9 to 11, the production instance of the application can continue to run unaffected (other than the initial impact of creating the virtual machine snapshot). The backup instance of the application can be created anywhere. For example, it can be created off-host from the production instance, possibly on a backup media server (e.g., the computer system 10.2 of FIG. 2) if it is desired to further improve the performance of the backup.

In both examples described above, the software of the application 42 can be assumed correctly to deal with broken network connections and correctly to perform an orderly shutdown. Such characteristics must be present in a business critical application.

As discussed, prior solutions to the application backup problem have always required either shutdown of the production instance, or hot backup or quiesce support from the application vendor, to guarantee consistency of the backup image. An example embodiment of the invention differs in that such requirements can be avoided.

It should be noted that virtual machine snapshots alone do not provide an adequate solution to the problem of providing backup because they can only be used to re-instate a virtual machine running the same version of the application at the captured point in time. The storage state is not guaranteed to be consistent; the application data cannot be accessed outside of this environment, and this does not allow for search and granular restore of application data. Accordingly, generating a virtual machine snapshot is not, on its own, suitable for long-term backup and archiving of application data. An embodiment of the invention differs therefrom in that it enables backup and archive software features to be provided.

Some existing backup solutions that are supported by application vendors use the production instance, thus having substantial performance impact on the production application. Existing solutions that use alternate instances of applications require that alternate instance to be constructed using a second installation of the application, which is started on a storage snapshot taken from the production instance. This invariably has one or more of the following drawbacks: It requires a quiesce of the production instance to create the storage snapshot, which has production impact, or it can not guarantee consistency of the application data. It also requires the second instance of the application to be installed and configured by the customer.

An embodiment of the process can be implemented by means of special purpose hardware, or by means of computer software operating on conventional general purpose computer hardware.

A computer program product for implementing the invention can be in the form of a computer program on a carrier medium. The carrier medium could be a storage medium, such as a solid state, magnetic, optical, magneto-optical or other storage medium. The carrier medium could be a transmission medium such as broadcast, telephonic, computer network, wired, wireless, electrical, electromagnetic, optical or indeed any other transmission medium.

Thus there has been described a system, method and computer program providing for the backup of a production instance of an application in a production machine environment by creating a snapshot image that captures the state of the machine, and then backing up the application from a backup machine created using the snapshot image. The backup of the application can be effected by shutdown of the backup machine or by using backup software to act on the backup version of the application.

Although in the described examples, virtual machine technology is used for creating a backup instance of a production application, and then the backup instance is used to create the backup of the application, other technology could be used. For example, software products that restore an image of a physical machine onto another physical machine could be used instead. Accordingly, it will be appreciated that the claimed invention is not limited to the specific examples described herein.

Thus, although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A computer system operable to:
   provide a first machine instance in which an application is run;
   take a snapshot image of the first machine instance;
   initiate a second machine instance from the snapshot; and
   backup the application from the second machine instance.

2. The computer system of claim 1, wherein the second machine instance does not share the network connections of the first machine instance.

3. The computer system of claim 1, wherein storage of the second machine instance forms a writable snapshot of storage of the first machine instance.

4. The computer system of claim 1, further operable to shut down the second machine instance, whereby an application state is saved to storage of the second machine instance.

5. The computer system of claim 4, further operable to backup the application state.

6. The computer system of claim 1, further operable to instruct backup software to use application agents to backup the application on the second machine instance.

7. The computer system of claim 1, wherein the first machine instance and the second machine instance are concurrently operable.

8. The computer system of claim 1, wherein the first machine instance is a first virtual machine and the second machine instance is a second virtual machine.

9. A method of performing a backup of an application operating in a first machine instance, the method comprising:
   taking a snapshot image of the first machine instance;
   initiating a second machine instance from the snapshot; and
   backing up the application from the second machine instance.

10. The method of claim 9, comprising configuring the second machine instance such that it does not share the network connections of the first machine instance.

11. The method of claim 9, wherein the storage of the second machine instance forms a writable snapshot of storage of the first machine instance.

12. The method of claim 9, comprising shutting down the second machine instance, whereby an application state is saved to storage.

13. The method of claim 12, operable to backup the application state saved to storage.

14. The method of claim 9, comprising backup software using application agents to backup the application on the second machine instance.

15. The method of claim 9, wherein the first machine instance continues to run unaffected apart from the initial impact of creating the snapshot image.

16. The method of claim 9, wherein the first machine instance is a first virtual machine and the second machine instance is a second virtual machine.

17. A tangible storage medium storing program instructions executable on a computer system comprising at least one processor and storage for performing a backup of an application operating in a first machine instance, the program instructions being executable to:
   take a snapshot image of the first machine instance;
   initiate a second machine instance from the snapshot; and
   backup the application from the second machine instance.

18. The storage medium of claim 17, wherein the program instructions are executable to configure the second machine instance such that it does not share the network connections of the first machine instance.

19. The storage medium of claim 18, wherein the storage of the second machine instance forms a writable snapshot of storage of the first machine instance.

20. The storage medium of claim 17, wherein the program instructions are executable to shut down the second machine instance, whereby an application state is saved to storage.

21. The storage medium of claim 17, wherein the program instructions are executable to backup an application state saved to storage.

22. The storage medium of claim 17, wherein the program instructions are further executable to cause backup software to use application agents to backup the application on the second machine instance.

23. The storage medium of claim 17, wherein the first machine instance continues to run unaffected apart from the initial impact of creating the snapshot image.

24. The storage medium of claim 17, wherein the first machine instance is a first virtual machine and the second machine instance is a second virtual machine.

* * * * *